US008639650B1

(12) United States Patent
Gill

(10) Patent No.: US 8,639,650 B1
(45) Date of Patent: Jan. 28, 2014

(54) PROFILE-RESPONSIVE SYSTEM FOR INFORMATION EXCHANGE IN HUMAN- AND DEVICE-ADAPTIVE QUERY-RESPONSE NETWORKS FOR TASK AND CROWD MANAGEMENT, DISTRIBUTED COLLABORATION AND DATA INTEGRATION

(76) Inventor: Susan Pierpoint Gill, Los Altos, CA (US)

(\*) Notice: Subject to any disclaimer, the term of this patent is extended or adjusted under 35 U.S.C. 154(b) by 656 days.

(21) Appl. No.: 12/817,167

(22) Filed: Jun. 16, 2010

Related U.S. Application Data

(63) Continuation-in-part of application No. 11/733,736, filed on Apr. 10, 2007, now Pat. No. 7,853,551, and a continuation-in-part of application No. 10/602,824, filed on Jun. 25, 2003, now abandoned.

(60) Provisional application No. 61/187,485, filed on Jun. 16, 2009.

(51) Int. Cl.
*G06F 15/18* (2006.01)
*G06F 17/00* (2006.01)
*G06N 5/04* (2006.01)

(52) U.S. Cl.
USPC .......................................................... 706/61

(58) Field of Classification Search
USPC .......................................................... 706/61
See application file for complete search history.

(56) References Cited

U.S. PATENT DOCUMENTS

| 5,506,886 | A | \* | 4/1996 | Maine et al. ............... 340/7.27 |
| 6,115,683 | A | \* | 9/2000 | Burstein et al. ............... 704/1 |
| 2007/0201086 | A1 | \* | 8/2007 | Kim et al. ............... 358/1.15 |
| 2008/0215623 | A1 | \* | 9/2008 | Ramer et al. ............... 707/104.1 |

OTHER PUBLICATIONS

'Identity construction on Facebook: Digital empowerment in anchored relationships': Zhao, 2008, Elsevier, Computers in human behavior.\*

\* cited by examiner

*Primary Examiner* — Kakali Chaki
*Assistant Examiner* — Peter Coughlan
(74) *Attorney, Agent, or Firm* — Fernandez & Associates, LLP

(57) ABSTRACT

Provided is a computer-implemented system and method for task allocation and distributed collaboration in a sender-receiver, query-response network that augments internet-based social networks with decision support such that private, personally targeted, timely, geo-located, tagged information enables users to contribute and respond to requests using natural language, receive postings customized to their user needs and preferences, and contribute to the collection, interpretation, aggregation, integration and distribution of data, enabling rapid status updates, reporting, and performance management in requester-responder networks that entail information-sharing, task distribution, crowd management and collaborative human-machine problem-solving across a diversity of computer, mobile and device platforms.

17 Claims, 9 Drawing Sheets

Web Application Serving Mobile Platforms

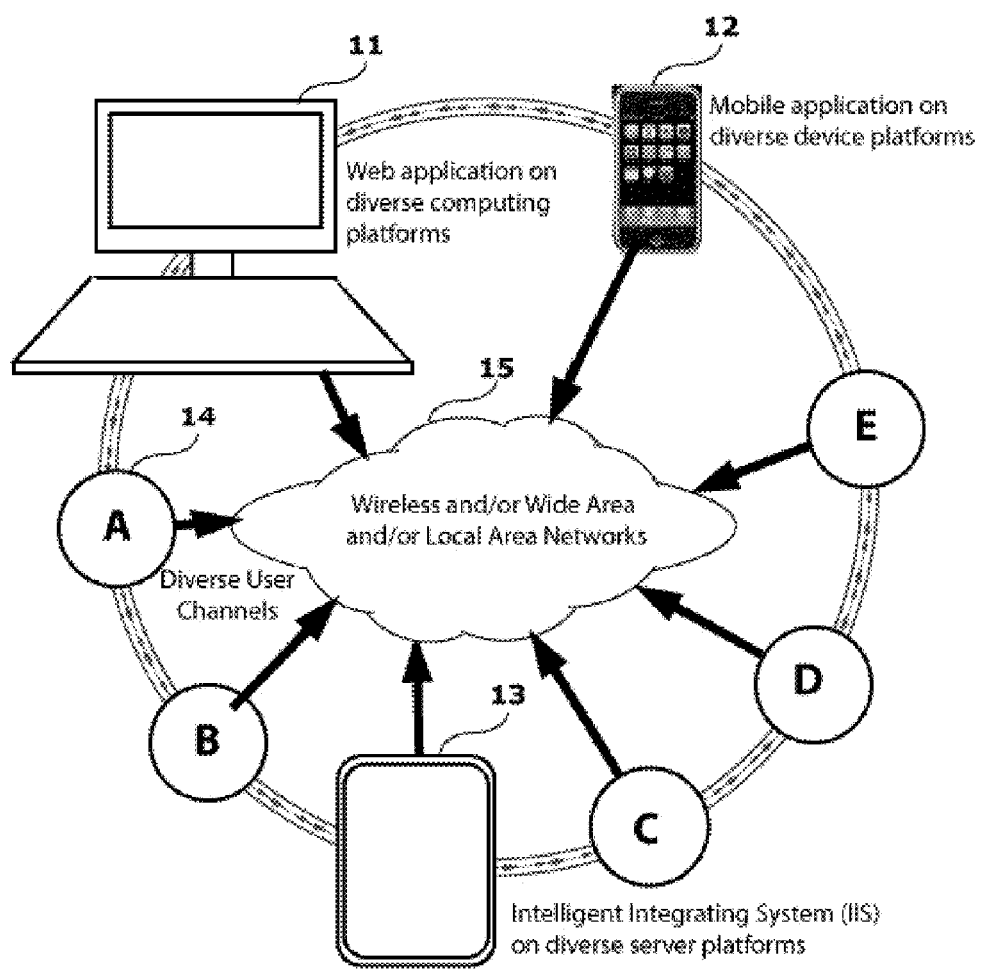
*Figure 1. Diverse User Channels and Platforms*

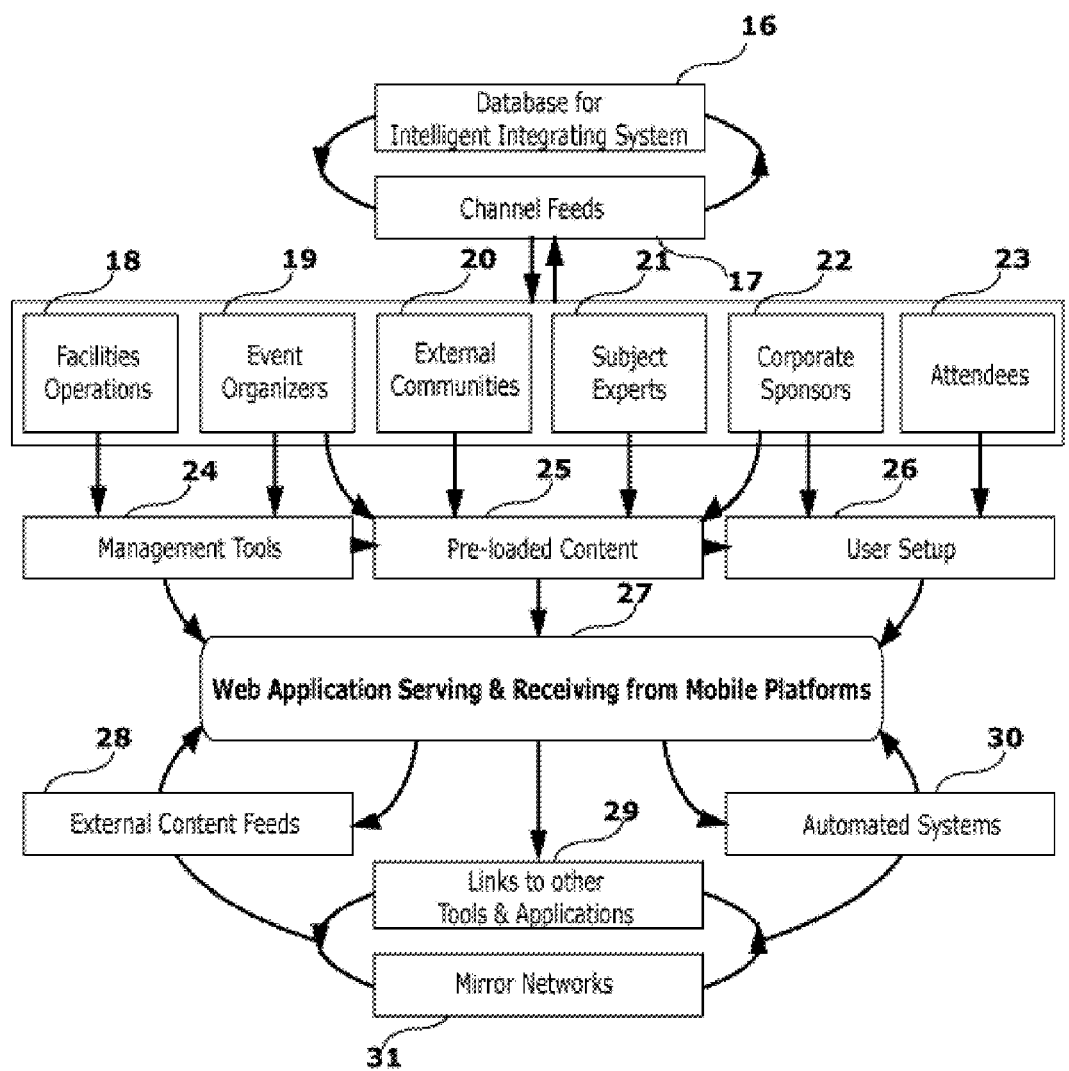
*Figure 2. Web Application Serving Mobile Platforms*

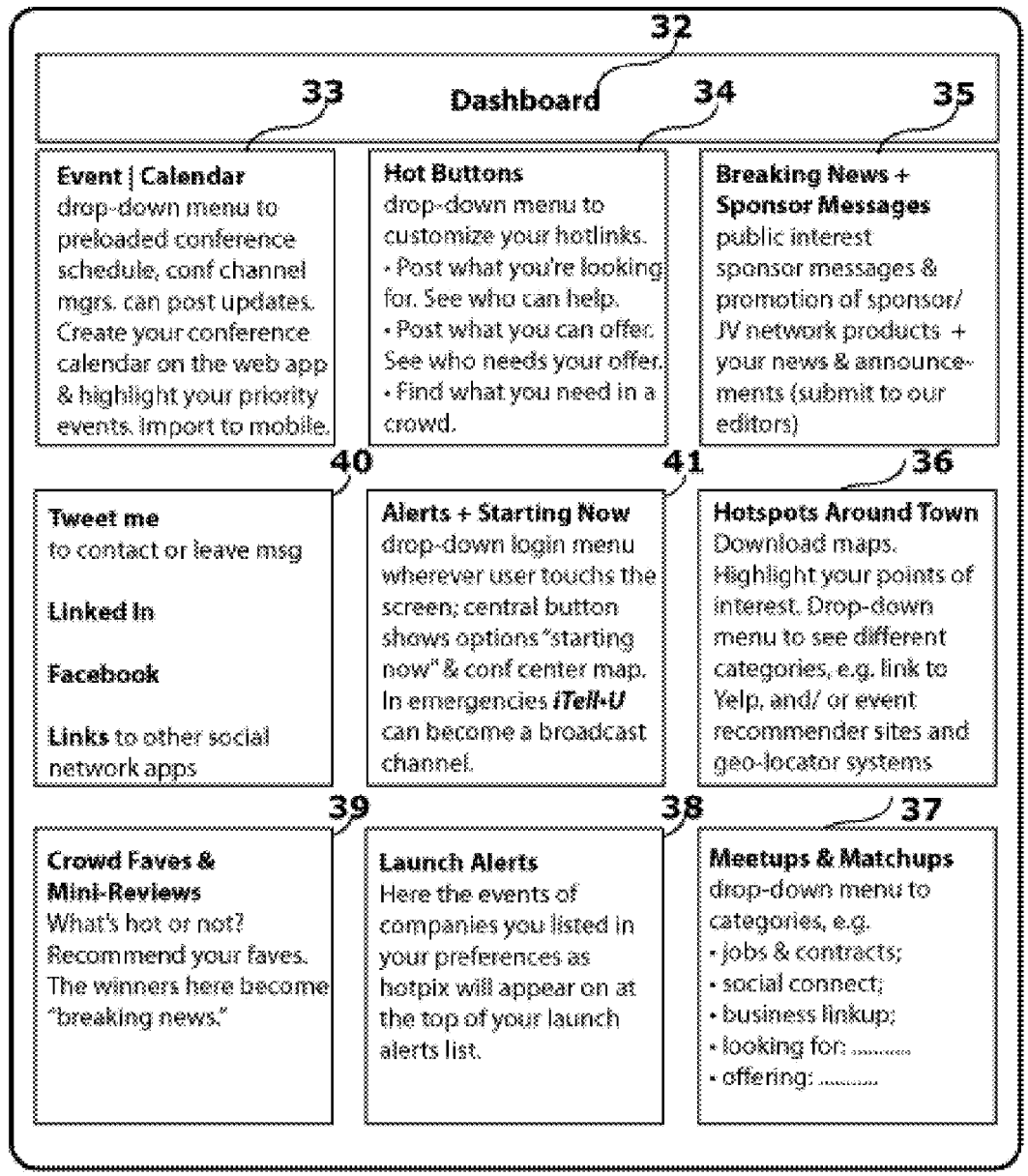
*Figure 3. Touch Screen User Interface & Feature Set in an Embodiment for Conventions and Trade Shows*

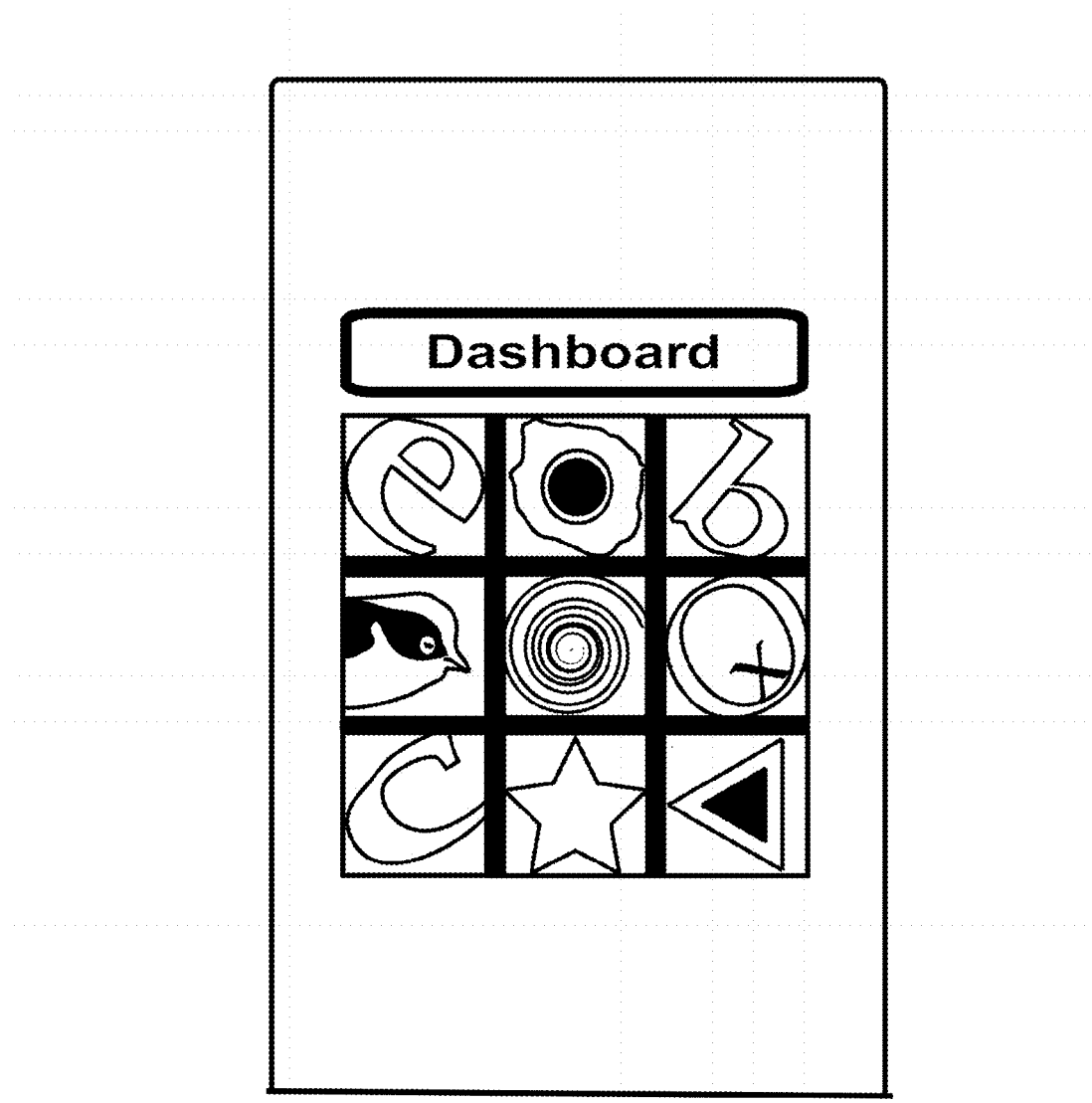
*Figure 4. Icon User Interface to Access Menus*

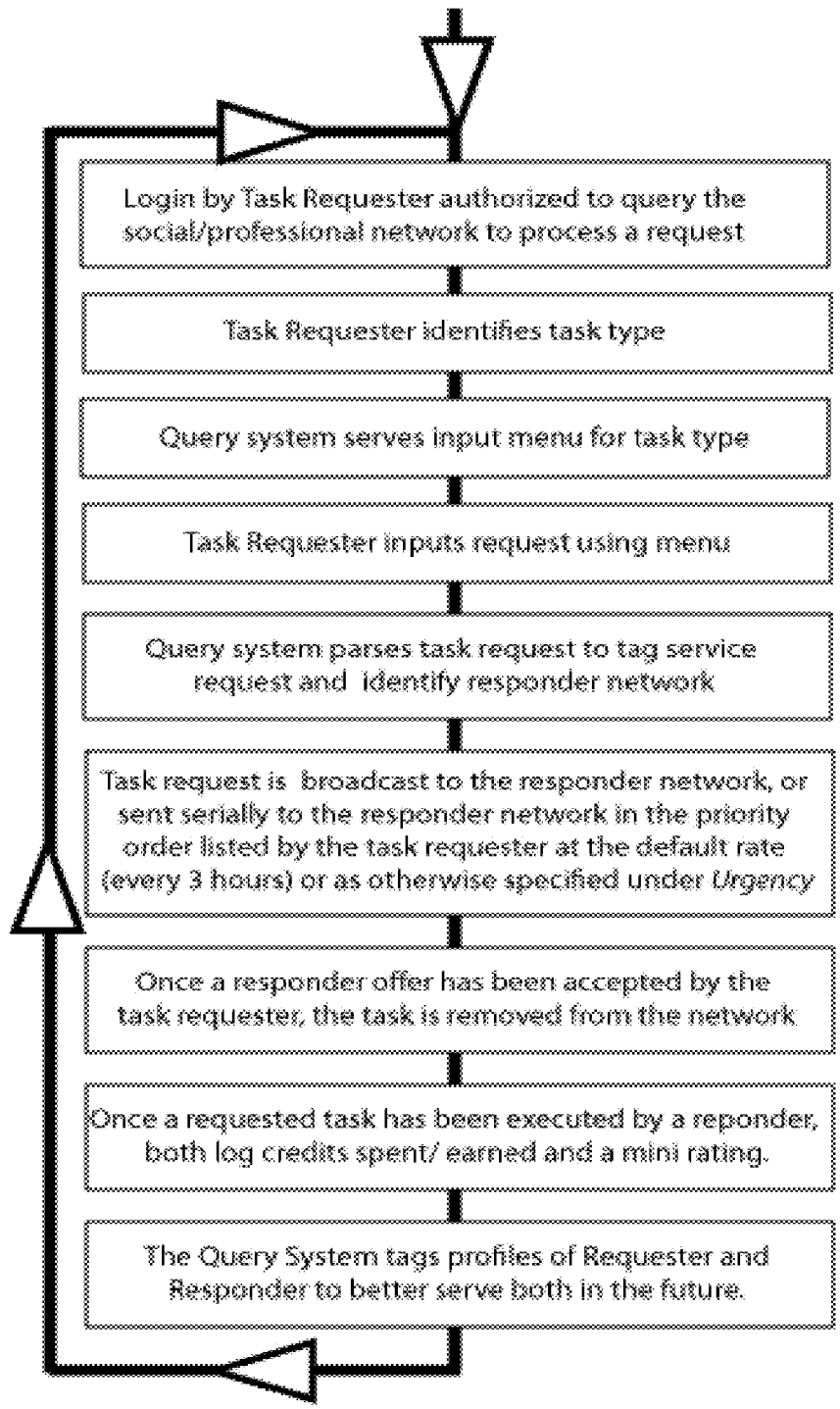
*Figure 5. Flow Diagram. Query Responder System*

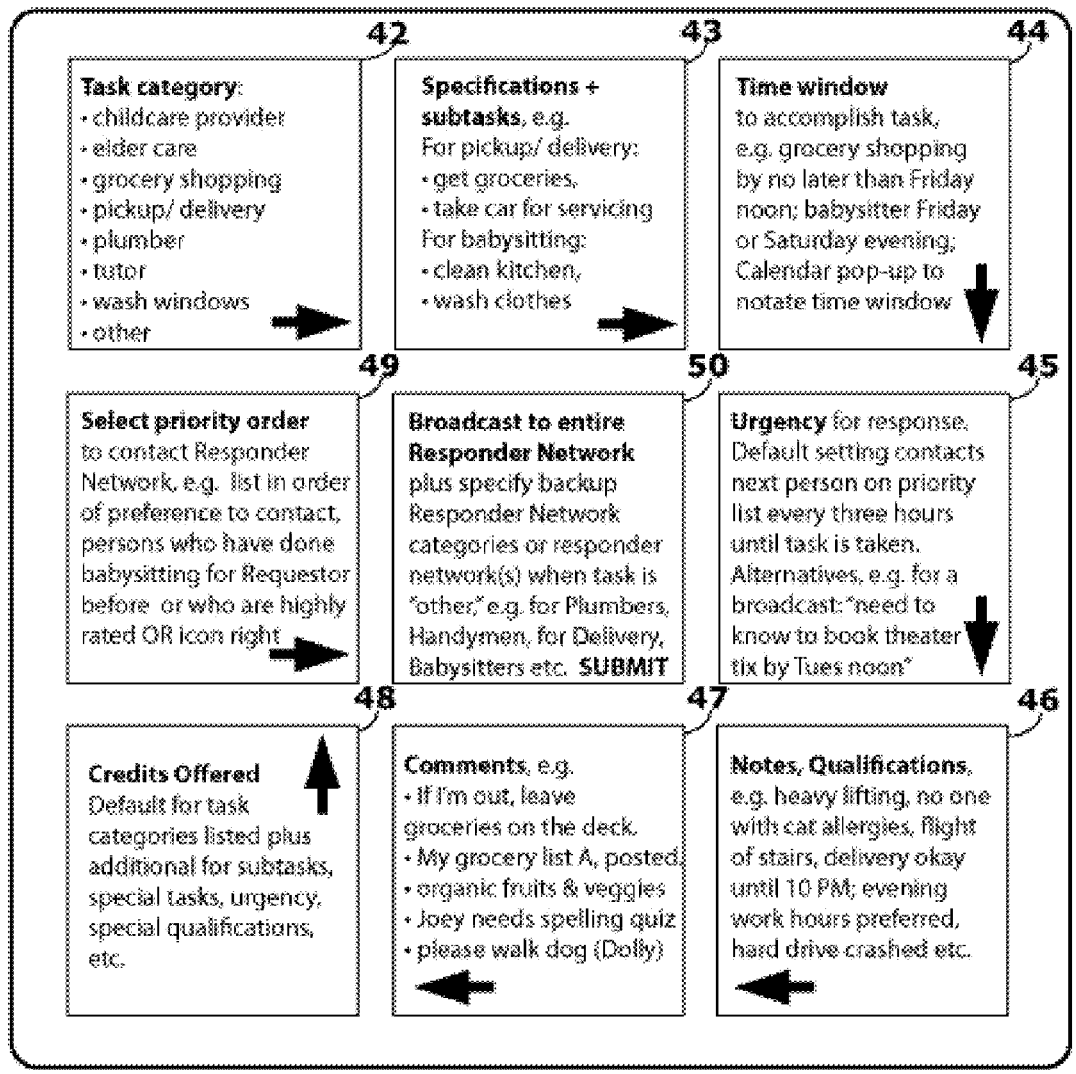
*Figure 6. Features Accessed by User Interface in an Embodiment for a Task Requester - Responder System*

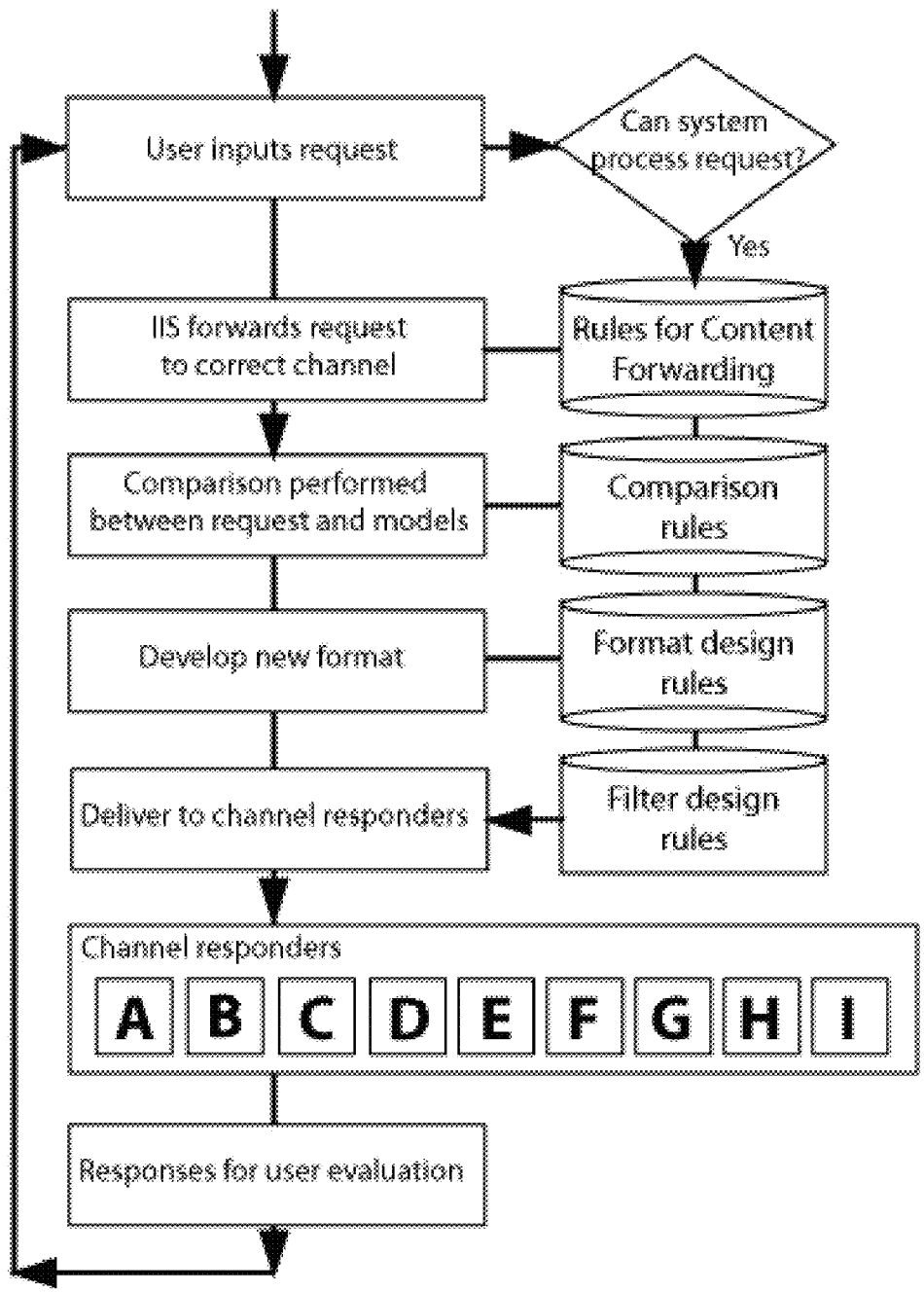
*Figure 7. Flow Diagram in a Multi-Channel System*

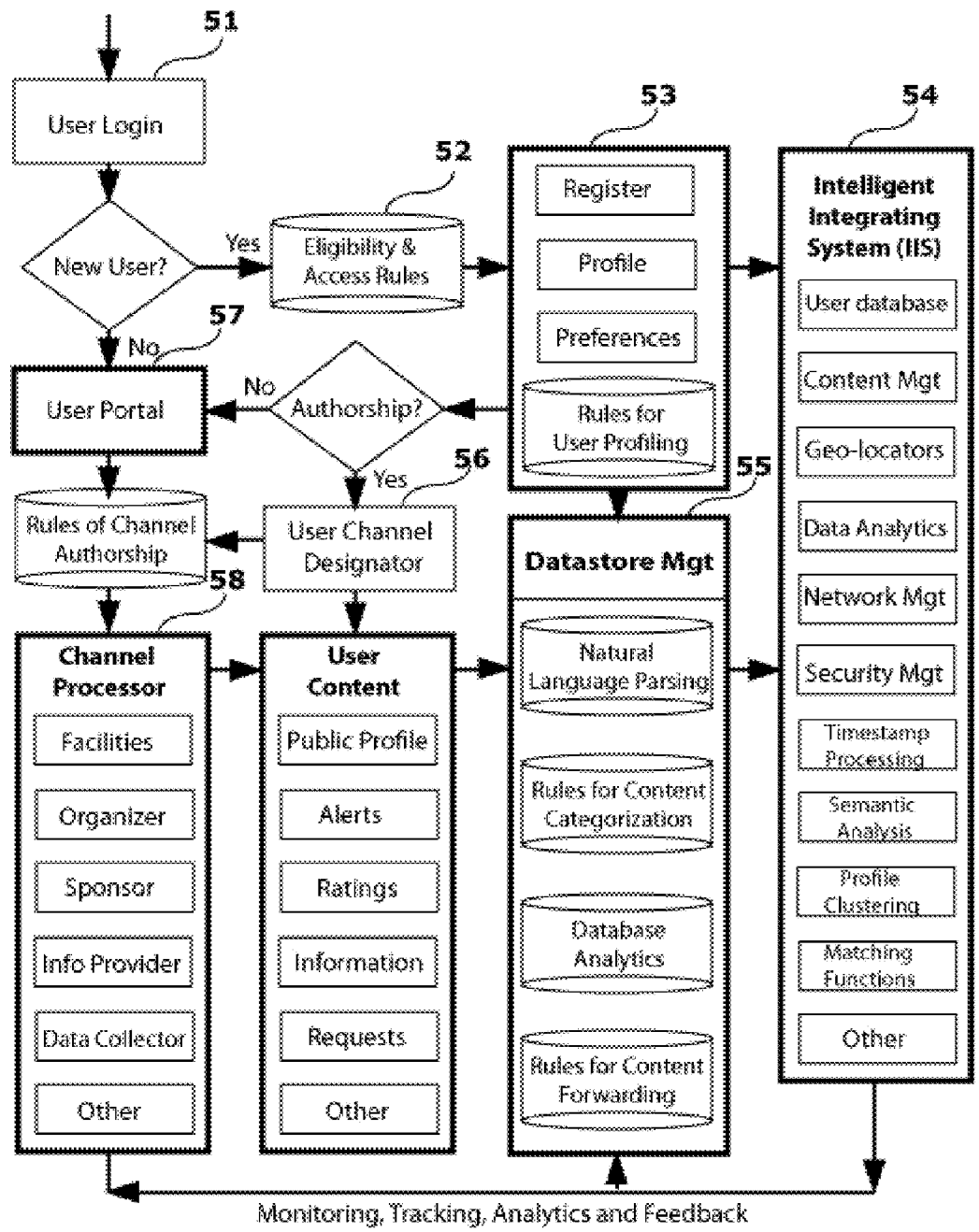
Figure 8. System Components & Architecture

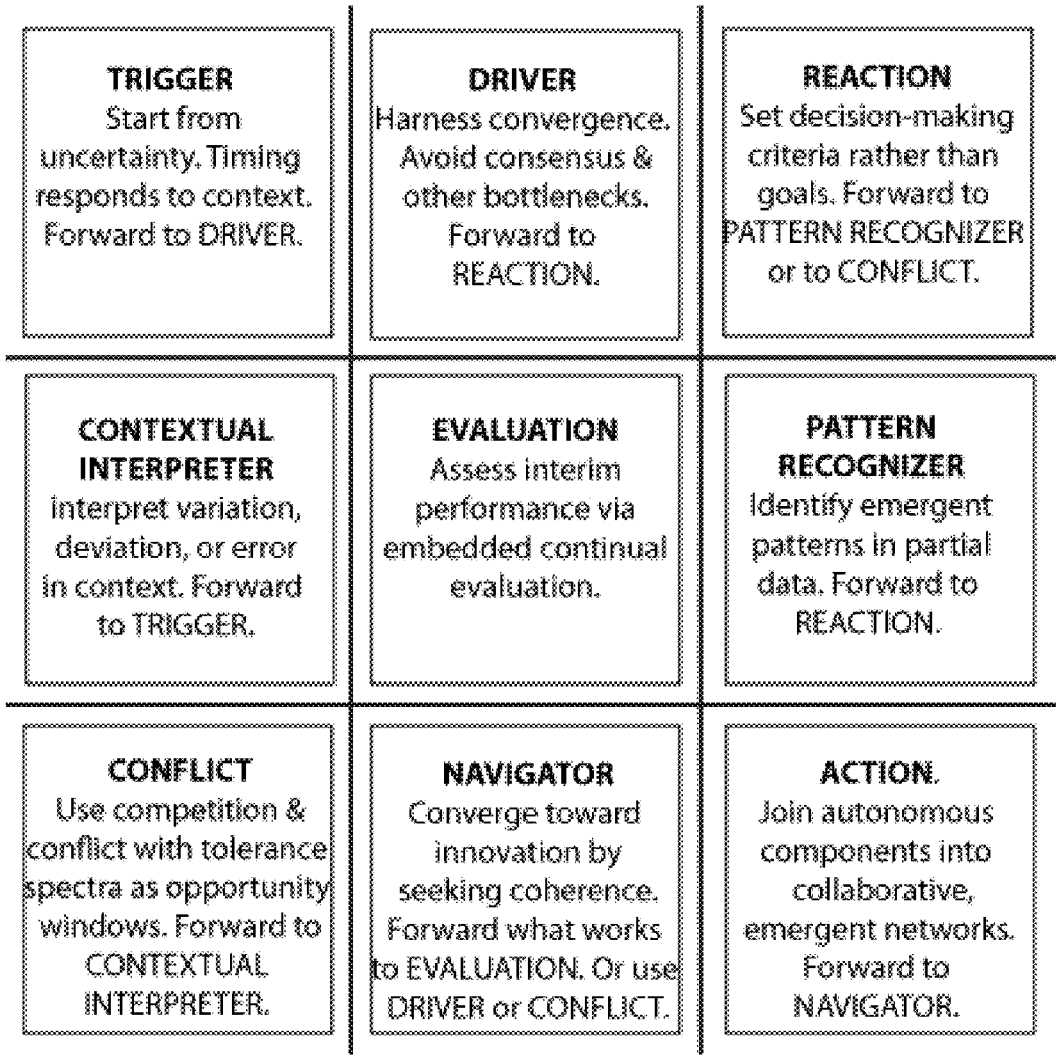
Figure 9. TRACE Collaborative System Architecture

PROFILE-RESPONSIVE SYSTEM FOR INFORMATION EXCHANGE IN HUMAN- AND DEVICE-ADAPTIVE QUERY-RESPONSE NETWORKS FOR TASK AND CROWD MANAGEMENT, DISTRIBUTED COLLABORATION AND DATA INTEGRATION

CROSS REFERENCE TO RELATED APPLICATIONS

This application is a continuation-in-part of co-pending U.S. patent application entitled "Natural Language Knowledge Processor Using TRACE Or Other Cognitive Process Models", Ser. No. 11/733,736 filed on Apr. 10, 2007, which is a continuation-in-part of U.S. patent application entitled "TRACE Cognitive Process Model And Knowledge Processor", Ser. No. 10/602,824, filed on Jun. 25, 2003 and claims priority from U.S. Provisional Patent Application No. 61/187,485 filed on Jun. 16, 2009, and incorporates those applications herein by reference for all purposes.

FIELD OF INVENTION

The invention provides a computer-implemented method to manage a diverse natural language sender-receiver network, including a task request and response network for distributed problem-solving, augmenting internet-based social networks such that those networked can collaborate via mobile devices, computers or other means to exchange timely, geo-located, topical, and personally targeted, information.

BACKGROUND

Advances in ubiquitous mobile computing make it possible to provide networked services to a distributed, diverse network of users. The rapid development and customization of web applications serving to mobile devices, and of geo-aware systems, enables a community network to implement just-in-time knowledge-sharing and response. Social Networks are the foundation for next generation user-responsive information systems, and for collaborative problem-solving networks engaging multiple co-dependent services, using geo-locators and timestamps to coordinate timely, effective response to user needs.

Computer science professionals have addressed the potential of collective intelligence algorithms to deliver better-than-average predictions in response to generally quantitative questions, such as "What will the price of DRAM be next year?" However, insufficient attention has been paid to the complementary potential of collaborative intelligence. The subject invention uniquely integrates collective intelligence with collaborative intelligence. The anonymity of system users, who can access the system from diverse computing and mobile device client platforms, is maintained by a back end that supports collective intelligence (defined here as the collected aggregate input of many anonymous discrete responders to specific, generally quantitative, questions). Alternatively, the system can shift from anonymity to acknowledged identity, supporting social network participation that harnesses collaborative intelligence (defined here as diverse, generally non-anonymous, credited, time-stamped participation in a natural language system, which may include qualitative input).

The convergence of environmental sustainability and information technology (GREEN-IT) offers potential to harness collaborative intelligence whereby, as in social networks, unique individuals participate according to their particular expertise in large in-person gatherings, ranging from conventions and trade shows to concerts and sporting events, as well as in distributed networks comprised of diverse human and computer agents, collaboratively performing services through applications that harness diverse skills to address complex problems. Environmental emergency and remediation, e.g. to respond to an oil spill, requires coordinating distributed, cross-disciplinary teams to achieve effective collaboration amongst non-anonymous persons with diverse expertise, across different disciplines, organizations and locations. Future distributed collaborative responder systems can address a broad array of needs, ranging from service and commodity provision, to social and professional knowledge-sharing, security and safety in environmental hazards, with potential to harness geo-aware devices, sensor networks and distributed, situation-aware technology.

Efforts in the field of the current invention have focused on automating problem-solving in data processing networks such that service requesters are routed to the correct service provider agent. Typically, such systems rely on the computer system's capacity for pattern recognition. The subject invention addresses the challenge to create a system that also harnesses human pattern recognition capacities where needed and delegates to the computer only tasks that the computer can effectively perform. The subject patent includes a human-computer interface, such that the system engages both human and computer pattern recognition skills Often systems are hierarchical, with top-level decision-making agency that hands down through the system. The subject invention enables browsing, whereby the user can choose among alternatives offered. Methods exist that use an interactive, or rule-based, processor to annotate (or tag) text with the symbols and vocabulary of a hypertext markup language, enabling the user to manipulate and view that information in different formats and at different levels of detail. However, the subject invention addresses the need for methods that effectively combine automated tagging with human recognition and rating systems.

The present invention differs from the prior art in that it exploits the complementarity of collective and collaborative intelligence, which also entails the integration of computer-automated tasks (suitable for collective intelligence) with human pattern recognition (required for collaborative intelligence). To harness the collaborative intelligence of diverse participants entails automated tagging of user profiles while also crediting individual contributions in a knowledge processing system wherein users share information, personal ratings, recommendations, assessments, and other communications.

SUMMARY

The present invention provides a computer-implemented systems and methods to support distributed knowledge-sharing, rapid updating, and task allocation for collaborative problem-solving via web applications, mobile devices, computers or other such devices on a network, which may be wireless, a wide area or local area network, the internet, intranet, or a private network, such as a localized community, a virtual private network, social or professional network, or a network of networks.

Supporting task and crowd management, product and service networks, the subject invention serves multiple categories of users, cross-referencing categories and user profiles. In one embodiment the system can provide information and just-in-time alerts, responding to user-stated preferences, user activity, and click profile. The original user-entered profile evolves, augmented through user activities in the system and ratings, such that the system can respond more effectively to user needs, and allocate tasks based on user capabilities. User entries and audit trails augment explicit preference settings and implicit preference indicators. Searchable content can be retrieved using key words or ontologies. User identities, as in social networks, include profiles and tags.

Entries and queries can be structured by the software to provide directed guidance to achieve convergent problem resolution, bypassing roadblocks of conventional, consensus-driven collaborative process models by enabling discrete responders on the network to input independent views, unconstrained by pressure for consensus. Iterative query structuring may be automated to allow machine response or use natural language to allow human judgment, in either case implementing an iterative query system that converges toward a problem resolution. Expert users trigger the system to launch more sophisticated rules, queries, and levels of participation.

A backend database supports an Intelligent Integrating System (IIS), which sorts and tags user profiles, providing multiple channels and levels of authoring and access for a growing, evolving, distributed, collaborative social network. IIS process records monitor levels and types of participation, such that the system evolves toward more effective performance. The subject invention offers capacity to serve and track one-to-one, one-to-some, and one-to-many alerts, notifications, broadcasts, and task requests, and to distribute information, alerts, and program updates, customized to user profiles and preferences. Where used in a task distribution network, tasks are distributed to first qualified responders, canceling, and so avoiding, duplicate responses. The subject invention provides the foundation for effective, efficient service for professional social networks in shared activities, ranging from conventions and trade shows, to community services, such as health care or emergency responder systems.

BRIEF DESCRIPTION OF THE DRAWINGS

The drawings illustrate the design and utility of embodiments of the present invention, in which similar elements are referred to by common reference numerals. In order to better appreciate the advantages and objects of the embodiments of the present invention, reference should be made to the accompanying drawings that illustrate these embodiments. However, the drawings depict only some embodiments of the invention, and should not be taken as limiting its scope. With this caveat, embodiments of the invention will be described and explained with additional specificity and detail through the use of the accompanying drawings in which:

FIG. 1 shows how the subject invention connects diverse computing systems 11, mobile devices 12 and server platforms 13 serving diverse user channels (14 A, B, C, D, E) across wireless, wide area, and local area networks 15.

FIG. 2 shows an abstracted conceptual diagram for one embodiment of the invention, a web application serving to mobile devices in a conference and trade show environment.

FIG. 3 shows one embodiment of the invention, with nine buttons represented on a mobile phone touch screen, or other user interface, applicable for, but not limited to, conference and trade show information systems, contributor-receiver systems, task requester-service provider systems (where service providers may also be task responders). All nine icons can be addressed by starting in the upper left-hand corner, circling clockwise, ending with the center icon to submit/ broadcast to the network, as shown in FIG. 6. In one embodiment, each icon of the mobile phone graphical user interface links to a feature set associated with said icon.

FIG. 4 shows one possible organization of mnemonic icons in a graphical user interface, where each icon can open scroll or dropdown menus covering the feature set of the system represented by said icon.

FIG. 5 shows a logical flow diagram for a Query Responder System and Task Requester in a transactional embodiment of the subject invention.

FIG. 6 illustrates how a user interface on multiple user devices in one embodiment of the present invention structures the problem-solving process and is used in this embodiment to match task requesters with task providers wherein the same icon is used by the task requester and also by the task responder.

FIG. 7 illustrates a logical flow diagram in a multi-channel system wherein the Intelligent Integrating System (IIS) sorts, tags, timestamps and forwards a user request to one or more channels for processing.

FIG. 8 illustrates the system components and architecture for one embodiment of the invention for Conferences and Tradeshows, wherein multiple channels serve different user roles and needs, offering different levels of permissions and authorship.

FIG. 9 illustrates an alternative mobile phone graphical user interface for an embodiment of the present invention for collaborative problem-solving, which uses the TRACE Cognitive Model and Knowledge Processor.

DETAILED DESCRIPTION

In the following description, for purposes of explanation, numerous specific details are set forth in order to provide a thorough understanding of the invention. It will be apparent, however, to one skilled in the art that the invention can be practiced without these specific details. As described herein, the term "server" shall include a single computer server or a plurality of computer servers. As described herein, the term "client" shall include client devices such as a wireless mobile device, cell phone, smart phone, or media player, a personal computer, navigation device, tablet, television set top box, or other networkable device.

The subject invention is a computer-implemented system serving distributed client computers and mobile devices, which combines collective intelligence methods, processing data from anonymous users, with collaborative intelligence methods wherein participant contributions are credited and tagged to individual contributors such that they become searchable "contributor fingerprints" (the total record of contributor actions in the system) enabling the system to cluster like users into subgroups, on which various automated procedures can be performed, including but not limited to, statistical analysis, predictive calculations, market and risk analysis, rating, tallying, grouping, tagging, sorting, linking user profiles, aggregating, integrating, targeting, publishing, retaining as confidential etc.

It is an object of the present invention to provide a natural language system comprising computer implemented methods and systems to elicit, receive, and organize information from multiple channels, wherein non-structured natural language queries and responses can be converted to structured components that can be tagged, analyzed, searched, clustered, sorted and integrated to satisfy activity requirements, user preferences, problem-solving constraints and trade-offs, in order to deliver information as needed in response to user requests, profiles, preferences and past usage activity in the system.

In one embodiment various automated procedures can be performed on queries and query responses, including but not limited to, statistical analysis, rating, tallying, grouping, tagging, linking to user profiles, aggregating, integrating, publishing for public comment, retaining as confidential etc. Query generators operate on data processing units, and query analyzers are able to receive, rate, cluster, search, tag and perform other operations on query responses.

One embodiment of the present invention presents the capacity for a user to register, either via the web or via mobile devices, to contribute and receive information customized to the user profile, as defined by user-selected preferences, by the user's prior history of activity in the system, authorship role, and relation to others using the system. When a user registers for a conference on a website, after purchasing a conference ticket, the user is directed to the website being used to set up a profile and preferences for that conference or event. The user can also enter the web application from diverse mobile devices. Users can log in, either via a custom website developed for that conference or event, e.g. "My [conference name]" or, for small conferences, via a unique conference channel on a general website, established to serve the subject invention.

FIG. 8 shows the user setup sequence. The user first logs in 51. The system is automated to check eligibility and access rules 52. The user can set up a profile 53, including, but not limited to, email address, through which the system can determine whether he's approved to register or not. The email address serves as the user ID, first name, last name, company, position, mobile phone (automatically recorded if the user registers or logs in from a mobile phone), website(s), password, and preferences. User preference options shown in FIG. 3 include, but are not limited to, My Calendar 33, sessions that the user has chosen to attend at this conference or event; Alerts and Starting Now 41 for sessions and events selected by the user or recommended; Maps 36 of the conference site and city surroundings; Networks 37, which includes people attending this event who share similar user preferences (matched by preferences). Breaking News 35, updates and other information; and Links 40 to complementary applications.

After the user registers by logging in and setting up a profile 53, a dashboard FIG. 3 is presented, accessing a menu list of setup items corresponding to the order of the buttons on the user interface, enabling the user to pick conference talks and events that he wants to attend 33 that feed to the "starting now" alert button 41, highlight a map of the tradeshow floor with booths the user chooses to attend 36, and choose preferences that will determine how priority alerts are received.

A basic embodiment of the present invention serves large events, such as conventions, tradeshows, and other venues where crowds gather, including hotels and airports. This embodiment of the invention provides a means to coordinate large conferences and trade shows, including means to rate products and services via multiple channels for different categories of users, products, and services. FIG. 2 shows one embodiment wherein an Intelligent Integrating System (IIS) 16 is comprised of a database categorizing multiple channel feeds 17, where channels serve different categories of users, in the embodiment of a trade show application including, but not limited to, Facilities Operations 18, Event Organizers 19, External Communities 20, Subject Experts 21, Corporate Sponsors 22, and Attendees 23. These different communities have different levels of access, permissions, and rights of authorship. The IIS tracks and records usage by ID, geographic-locators, timestamps, category of user and user actions in the system.

A user may be a member in more than one user category but can participate in only one category at a time. Management tools 24 from Facilities Operations 18 include safety and evacuation information and surveillance systems, a map of the facility with rest rooms, food service, lost and found and other information provided for participants. Management tools 24, offered by Event Organizers 19 to Attendees 23 include ability to sign-up for space-limited workshops, to comment on events, and to broadcast alerts, filtered by event organizers, who can track attendee interest and retain profiles of attendees for future event planning. Pre-loaded content 25 from Event Organizers 19, External Communities 20, Subject Experts 21, and Corporate Sponsors 22, enables Attendees 23, when they register, to employ User Setup 26 to choose events to populate their calendars, functions to attend, and to enter profile and then preferences for notifications and alerts.

The functions 18-26, described above, comprise one embodiment for a multi-channel system with capacity to grow and evolve through use as users post recommendations to others. Optional augmented functions include External Content Feeds 28, Links to other tools and applications 29, Automated Systems 30, with potential for the system database and its members to be translated to other Minor Networks 31. In a trade show application, channels include pre-loaded and on-the-fly content from the host location 28, venue or conference center facility operations 18, conference organizers 19, speakers 21, corporate sponsors 22, which may include technology demonstrators, attendees 23, and other stakeholders for the event.

The subject invention can track who went to which corporate trade show booths, how long they stayed, and which products were of interest to them. It also serves users, enabling them to see rapidly what's available, who's where, to receive alerts about events starting soon, and to set preferences for alerts and other notifications. This embodiment of the present invention is an interactive system, providing multiple channels for host venues 20 and 28, convention centers 18, conference or trade show organizers 19, keynote speakers 21, corporate participants 22 and attendees 23, enabling each of these stakeholders to find what they need and to better contribute to and benefit from to the event. The two basic roles of the system, contributor and receiver, are implemented with different subcategories and levels of access. For example, a conference organizer is one category of contributor; an industry sponsor is another; an attendee is a third.

When the user clicks Calendar setup 33, he is presented with the option to create his own conference calendar on the web application, which he can also access from his mobile device. Alternatively, in some embodiments, the calendar can also be created on the mobile device. The Calendar|Events button 33 connects to the conference schedule, other conference events, sponsor events, and related activities as appropriate. Different categories of users are able to post events to an event calendar, including, but not limited to, location, date, time, host, and comments. For attendees the user interface includes the functionality of Hot Buttons 34, which the user can customize into personal hotlinks. The Breaking News Button 35 offers a scroll or dropdown menu where news and announcements from conference organizers, corporate sponsor messages, and other important notices can be posted as the event progresses. Users receive postings, prioritized according to their explicit, stated preferences and implicit preferences, defined through previous use of the system. The Maps|"around town" button 36, connects to conference sponsored events, local events during the conference period, user-announced or recommended events, a metro map, downtown transport, and related information. It also serves as a Hotspots Button 36 offering a scroll or dropdown menu where users can download maps and highlight their points of interest.

In the embodiment shown in FIG. 3, a Launch Alerts Button 41 provides a place for sponsor notifications, which enables users to gain an overview of events, demos, launches or other special offers. Companies listed in each user's preferences appear at the top of their launch alerts list. Corporate sponsors can post their messages, customized for receipt according to user profiles and stated preferences. A Rate and Review Button 39 enables users to rate and recommend their favorites, such that those items most recommended are forwarded to the Breaking News list 35. Competition opportunities may also be posted as "Hot Buttons" 34. In addition, the system offers the user capacity to post what he is looking for, and to post what he can offer 34. In one embodiment this function can be used by employers to post job notices, or by job-seekers to post their skills. A Meetups and Matchups Button 37 offers a dropdown menu wherein users can, through multiple choice questions and/or short text messages, create their personalized profile signature for recommendations of whom to meet at the event or wherever the system of the subject invention is being used.

A Links Button 40 enables users to link to other Social Network applications, and to use complementary web applications. Notifications can be distributed to different categories, as designated by the organizers. These may include alerts to profile-relevant opportunities, organizer and sponsor functions. In one embodiment, links to Notifications (categories, such as jobs, hires, tech launches etc.) include alerts to profile-relevant opportunities and organizer and sponsor functions, enabling organizers to update the program or call spontaneous meetings, as when new technology is launched at a trade show.

A range of stakeholders can provide 35 pre-loaded rich content, which, in the embodiment customized for conventions and trade shows FIG. 2, can include content from the hosting city 28, the convention center 18, conference organizers 19, and sponsors 22. New content can be added on-the-fly, in real time, from multiple channels, including, but not limited to, organizers 19, sponsors 22, and users/attendees 23. The Breaking News button connects to the news network channels of the system 35. The launch alerts button 41 links to a related suite of technology tools, which complement the subject invention. An embedded continual assessment tool provides data about the success of the event, how users participated, and their preferences.

The above basic embodiment, once implemented, can be adapted to serve a range of other types of applications, based on the multi-channel, contributor-receiver model, such as Disaster response following a hurricane, earthquake, or other catastrophe, Health and clinic network response and elder homecare emergencies, Networked learning initiatives, group projects, monitoring student progress, Distributed teamwork, onsite/offsite/diverse locations.

FIG. 3 shows a second embodiment of the present invention to address easily specified tasks, such as, but not limited to, activities, announcements, classes, delivery, events, childcare, interest groups, rideshare, volunteer opportunities, where the Task Requester specifies the task, and Task Responders offer to perform the task.

This second embodiment of the invention could also be used, as shown in FIG. 6, as a method for Task Requesters and Task Responders to participate in a service network wherein the User first logs in with an ID and password. Users can be both Task Requesters and Task Responders, although some may use the system primarily, or exclusively, in one mode or the other. Everyone in the system has credits, either as a result of performing work that earns credits, or as a result of buying credits in the system. Those who use the system exclusively as Task Requesters gain credits by purchasing them, while those who use the System both as Task Requesters and as Service Providers, can exchange their products or services within the system for credits, which they can then spend to purchase other goods and services, or translate into cash payments periodically. A Task Requester pays in credits, transferred from his account to the account of the Task Responder. If the Task Requester has insufficient credits when he requests his next task, the system will remind him to refill his account.

A third cluster of community-related applications applies the present invention to enable community members to address community applications, such as safety and security (police protection), fire protection, transport (e.g. share-a-ride, bus, train, plane schedules), tourist information (hotels and restaurants, local interest events), commodity availability, searchable in various ways, e.g. by commodity, costs, home and office rentals, locations, need, services, store hours, real estate for sale.

A fourth, embodiment of the present invention addresses tasks requiring cross-disciplinary expertise, such as sustainable remediation and disaster relief, where a coordinated systemic response requires knowing who can supply what, when, and where, and who needs what, when, and where. This fourth cluster of applications supports a range of tracking and logistics functions, such as supply chain tracking, networked systems tracking, carbon footprint tracking, water tracking, and so on, applying, with some modifications, the backend developed for the first, second, and third applications above. Augmenting traditional methods of problem-tracking, the subject invention can cross-reference user actions within the system.

In applications, such as disaster relief or sustainable remediation, Task Requesters can instantly shift to become Responders and vice versa. The system enables rapid exchange of information from one to some or many, some to some or many, many to many, geographically locating items, people, tasks, and resources being tracked by Task Requesters and Responders, time-stamping Requests when submitted and Responses when committed (start time) and completed (end time), structuring and organizing problem-solving status updates to enable collaboration in unpredicted circumstances. The geographical locator stamping, and tagging of user entries and responses, allows geographic analysis of user needs and resources, and capabilities to meet those needs, by the Intelligent Integrating System (IIS), specifying queries by neighborhood, city, region, or other geographically defined category and clustering responses by location and other relevance factors, as well as performing profile analysis of users and comparative clustering across geographic categories with similar challenges and attributes where geographically specified sub-routines can be specified by task requesters to the query system running in a defined region.

The present invention enables greater efficiency in addressing tasks within a geo-proximal community, or in complex situations, which require rapid response on the fly, in real time, as in instances where traditional systems break down or prove inadequate. Problem mapping tracks process steps, which users may follow serially, in pre-specified or specified-on-the-fly sequence, or in user-selected order as circumstances require. Task order of execution is logged using an alpha-numeric interface, e.g. on a mobile phone or computer keypad, or a clickable or touch-screen graphical user interface. Distributed agents (human or not) gather, share information and collaborate to respond to problems posted as Task Requests.

Collaborative problem-solving by a distributed, cross-disciplinary human-agent social network entails pattern recognition and/or automated discovery and dynamic integration of distributed input from autonomous agents and human users, enabled by an Intelligent Integrating System (IIS). The IIS presents prompts that elicit human judgment in response. The IIS sorts entries into multiple categories, serving profile-responsive queries, tracking responses, performing aggregation and providing status updates, as well as sharing status updates at different stages of a collaborative problem-solving process. The IIS integrates data gathered from task performance, which can be automated for some functions, or support human computer interaction for others. The IIS tracks progress, archiving searchable process records and statistics. IIS services, processing functions, query systems, and integrator functions are core processes serving its distributed network.

The coding of data enables data representation and data integration, which could comprise any or all of the following methods of classifying query responses received based upon: steps of query intake through an alphanumeric keyboard or graphical user interface; time-stamps and geographic locators, context-coded natural language classifications and tags; mapping relationships, archiving relationship maps in a computer readable storage device so that they can be accessed from multiple nodes and retrieved in various ways; and updating responder profiles based upon query responses received from each responder.

The subject invention can be designed, where desirable, to have a game-like look and feel, and to apply traditional game techniques to motivate participation: points, prizes, levels, rewards, pingbacks, coupons, clues, tokens as components that can be selectively embedded into the system. Translating game-like attributes into the system motivates participation in the social network's problem-solving process, enhancing its service. Credit points can be converted into prizes and/or into cash payment for services, wherein a responder's level of contribution and expertise can be rated, using existing click-streaming technology and, as in computer games, such that contributors advance to higher levels of participation based on their level of expertise and the value of their contribution, which can, in one embodiment, be measured through a credit points reward system wherein contributors are paid, or otherwise rewarded by credit points earned. In one embodiment, a first round, and each subsequent round of entries, serves as the basis for automated generation of future queries based upon previous query responses, comprising the steps of retrieving query responses from an individual agent or from one or more group of agents; segmenting the response into key phrases; scanning each phrase for pattern already in a pattern library and for new patterns that need to be archived; and producing a query generator for each query response grouping found, or selecting a query generator from among those that respond to similar response profiles.

In one embodiment of the invention user profiles can be augmented through credits, exchanges, rewards, ratings and embedded continual assessment, responding to individual and changing program needs. As in social networks, each user can invite friends to join and, as in pyramid models, contributors' total credit points are the summation, not only of their own credits, but a pre-selected % of the credit points of those they have directly invited and smaller % of those downstream from their direct invitee list, such that credit points of service providers may be translated to cash at defined payment intervals.

The subject invention provides for different levels of authorship, permissions, content filtering and access. Entitlement permissions are adjustable as the problem-solving process requires, ranging from confidential and anonymous to readable, open for comment, permission to edit, anonymous or credited to the contributor. Ratings or reward points may accrue to highly rated contributors, and where categories of permissions, and means of granting permissions can be revised.

One embodiment of the present invention enables dynamic distribution of tasks from Task Requesters with diverse needs to Task Responders with different skills Each Task Request is time-stamped, geo-located and logged into the IIS knowledge processor, which tracks tasks accepted and performed, and logs performance ratings. User profiles, credits, and credibility evolve through use of the system. The system issues, and efficiently responds to, Task Requests. Task Requesters submit requests. Task Responders survey requests (sorted by time, type, geographic location etc.), prioritize and respond to those they can most effectively perform. Through a credit exchange network, Responders earn credits for tasks performed, and Requesters pay for tasks.

One application of the Task Requester-Responder embodiment could address daily, often-needed household tasks, from plumbing to childcare to home delivery. The present invention enables more efficient delivery of a range of consumer products and services. In particular, the present invention enables sole proprietors and small business owners to participate in a network system able to deliver service advantages equivalent to those of larger companies—rapid response time, diversity of expertise, and reputation.

Once logged in, the User chooses between two roles, in this embodiment consisting of:

1. Task Requester
2. Task Responder (Service Provider)

In other embodiments these contributor-receiver roles might include organizer and participant, health care provider and patient, teacher and student, and so on. If at the Welcome Screen the user chooses Task Requester, he'll see credits remaining in his account and be able to click to see costs of various tasks he might request. A text box will allow him to propose a task not on the list and propose a fee (payable in credit units) for that task, subject to approval.

It is an object of the present invention to enable collaborative problem solving, supported by a data processing network, through querying distributed agents and/or clients; receiving and integrating responses; generating, by the Intelligent Integrating System (IIS), new queries based upon Task Requester needs and user performance capability as defined by assessments, tagged to user profiles; maintaining individual responses private/anonymous, or making them visible/credited, as specified by the task requester or by each participant; providing regular updates of the globally integrated response status visible to the social network as needed so that participating users can comment; receiving and parsing natural language input from responders independently of each other when responders should not be influenced by each others' responses; and publishing selected responses for comment, rating or vote from a large, distributed group of user-responders when an iterative process, such as the Delphi method of repeated polling, is used to achieve convergence.

In one embodiment of the present invention, the query system on a mobile phone or other device, has a touch screen user interface with nine icons, arranged like a tic-tac-toe board, enabling the user to follow a multi-step process sequentially, or in an order that is pre-specified or specified on-the fly, or in a user-selected order, and repeating steps as necessary, depending on the task, which in one embodiment can include wiki collaboration capacity. The graphical user interface represents response categories on an evolving, navigable content map.

When a User logs in for the first time, he's prompted to enter basic profile information. Since he won't have performed any services to date, he'll acquire credits through setting up a account. He must click to agree to the network rules: default charges for specified tasks, conditions when special additional charges are permitted etc. Once enrolled in the network as a Task Requester (one can enroll as a Task Requester without enrolling as a Task Responder), he will see a touch screen system as in FIG. 6:

1) Starting in the upper left icon 42 in FIG. 6, the Task Requester chooses a task, e.g. "plumbing."
2) Moving to the right, to the upper middle icon and scroll or pull-down menu 43, he specifies task and subtasks, e.g. "unclog kitchen sink"+"check slow bathtub drain."
3) Moving right to the upper right-hand icon and pull-down menu 44, he selects the Time Frame, a late afternoon window, any day.
4) Continuing clockwise down to the right-hand middle icon and scroll or pull-down menu 45, he specifies high urgency; contact priority plumber #1 first. After 1 hour, contact priority plumber #2. After two hours (if there's been no response) broadcast to the plumber network. After three hours (if there's been no response) broadcast to the Handyman Network.
5) Continuing clockwise to the right-hand bottom icon and scroll or pull-down menu 46, labeled Notes, he posts special qualifications that might preclude someone from performing the task, e.g. plumbing backup may require floor removal to access pipes. Or qualifications that allow someone with a day job to perform the task after hours: plumbing work okay until 9 PM.
6) Continuing clockwise to the middle bottom icon and scroll or pull-down menu 47, he adds Comments, special instructions not covered elsewhere.
7) Continuing clockwise to the left-hand bottom icon and scroll or pull-down menu 48, he notes default rates for plumbing network/handyman network. He can approve after hours rates at 1.5 default rate, special conditions or accept special offers.
8) Continuing clockwise to the left-hand middle icon and scroll or pull-down menu 49, he specifies the Plumber Network and chooses his first and second preferences, plumbers he's worked with before.
9) Ending on the center middle icon and scroll or pull-down menu 50, he clicks "Submit" to broadcast to the Plumber Network (after his top two plumber choices have been given first chance to respond). He specifies a backup network, the Handyman Network, to broadcast to if someone from the Plumber Network hasn't taken the task within the specified time window.

Each icon, when clicked, opens to a window with a multiple choice list, plus the alternative, "other," which opens a text box. Upon responding to all nine icons, the system prompts, "Ready to submit?" If he responds "Yes, submit," his request is tagged, time-stamped and sent to appropriate network(s). If he responds, "Stop|revise," he can revisit any or all of the nine icons to revise his request before submitting. FIG. 6 shows the clockwise structure of the graphical user interface in one embodiment.

If at the Welcome Screen the User chooses "Task Responder," rather than "Task Requester" on his first login, he'll be prompted to enter basic information, office location, phone numbers, Plumber's License # and special info (e.g. available 6 AM to 9 PM). He clicks to agree to the network rules, which may include, but are not limited to default charges for specified tasks, conditions when special additional charges are permitted etc.

After a one-time only registration on the Plumbers' Network, he sees a touch screen system:

1) Starting with the upper left icon 42 in FIG. 6, the Task Responder chooses a task, e.g. "plumbing" and sees a list of Task Requests. He clicks on a Task Request he might respond to.
2) Moving to the right, to the upper middle icon 43, he sees the address of the task request and a clickable map with directions and task specifics: "unclog kitchen sink"+"check slow bathtub drain."
3) Moving right to the upper right-hand icon 44, he sees the time the Task Request was submitted, the Requester's Time Windows and Deadline to Complete.
4) Continuing clockwise down to the middle right-hand icon 45, which specifies high urgency level, he responds, saying when he can be at the task location.
5) Continuing clockwise down to the bottom right-hand icon 46 he reads Notes and Details: This Task Requester wants him to call first to discuss the task before taking it (possibly the Requester wants to conduct phone interviews with several candidates first). So he calls. He also notes listed qualifications that might preclude someone from performing the task, e.g. plumbing backup may require floor removal to access pipes and writes in that he also has a contractor's license and can do the floor removal/replacement.
6) Continuing clockwise to the middle bottom icon 47, Comments, he texts that he has a job at a nearby location, but that it may run overtime so after 5 PM would be best.
7) Continuing clockwise to the left-hand bottom icon 48, he accepts the terms: default credits for plumbing network/handyman network and approves after hours rates at 1.5 default rate, saying that he can perform the task between 5 and 9 PM if preferred. He clicks "agree."
8) Continuing clockwise up to the left-hand middle icon 49, he prioritizes, dragging and dropping to reorder his selected list of Task Requests he would like to respond to. He decides to retain (or not retain) any given task on his To Do Options list.
9) He ends at the final, Center middle icon 50, having decided which of the tasks listed on his middle screen to accept first. He can accept only one task at a time. When he accepts a task, it is automatically removed from all other plumbers' option screens. He proceeds to the location to perform this task. Other tasks he prioritized and retained to his option screen (middle icon) remain there, unless taken by other plumbers.

The system automatically removes tasks as they are taken and also blocks Task Responders from taking tasks if the Task Requester has specified: "Call Task Requester" before accepting task. This allows the Task Requester to interview several candidates before deciding, e.g. which babysitter to hire or which dog-walker is best suited to walk the dog. The level of automation can be customized, enabling the present invention to be used where personal contact is required prior to task acceptance by the service provider.

FIG. 7 shows how the system handles a generic user request, determining first whether the system can process the request or not, and, if yes, thereafter applying a series of rules to process the request and deliver it to the appropriate channel responder(s).

FIG. 8 shows the system architecture where users log in 51 to a system comprising both public access and multiple levels of privacy, depending upon user category and role in the system 52. New users must register, fill out a profile and select preferences 53. This information used to determine how the system will receive content from and deliver content to them. Users have different levels of authorship, determined by a user channel designator 56. They contribute content of different types and receive content according to their profiles, category of use 58, preferences, and past history of using the system 54. User content is managed by a datastore management system 55, that feeds into the intelligent integrating system 54, which processes data such that users can receive customized information according to their preferences 53.

FIG. 9 shows one embodiment of the invention, wherein the system is comprised of nine steps, five primary steps (referred to herein as the TRACE model, acronym for the five key steps) and four supporting steps, enabling users rapidly to access prompts and log their input.

TRIGGER (top left icon)—a Task Request or Query calling for response; when a Task Requester presses the trigger button on a user interface, the system records a GPS locator and timestamp. The user enters Task Requests or other triggers to investigate: problems, questions, observations. Proceed clockwise. Forward to DRIVER.

Driver (top middle icon)—Add details, e.g. for babysitter request, child's age, hobbies, favorite games. For handyman request: fix broken picnic table leg. Or, for collaborative tasks, team members respond to the trigger, adding relevant information from their perspectives, tasks and resources needed to address the problem. Forward to REACTION.

REACTION—In one embodiment a time window and deadlines are logged here. In other embodiments this third step identifies not only time constraints, but also other constraints and decision criteria (e.g. a medical emergency, heart attack victim). If criteria are co-dependent, they are linked. If they conflict, skip to CONFLICT. Otherwise continue to PATTERN RECOGNIZER.

Pattern Recognizer—Responders enter suggestions and overall project status, as well as priority action items. Forward to ACTION.

ACTION—Team members identify clusters of people, resources, tasks, needs etc. to augment by clustering. Forward to NAVIGATOR.

Navigator—Each team member distinguishes what's working from what isn't. What's working is forwarded to EVALUATION; what's not is forwarded to DRIVER or CONFLICT.

COMPETITIVE ANALYSIS—Identify and tag mutually conflicting specifications, e.g. instances where resource limitations demand tradeoffs (e.g. not enough ambulances for medical emergencies). Define tolerance windows appropriate to the problem context. Identify competition. In non-emergency response applications, such as learning applications, this step can define competitions/challenges to enlist game participation. Forward to CONTEXTUAL INTERPRETER.

Contextual Interpreter—Choose Task Responders in one embodiment. OR collect information, assessments, and proposals from selected Responders. Each intake is logged with individual contact details, GPS, and timestamp. Forward to EVALUATION.

EVALUATION—Responder ratings may be either by number of Requests "closed" or by assessment of Task Requesters. At pre-selected time intervals, the system updates its Project Status Report. Users provide input on the status of their tasks by clicking SUBMIT and can request an UPDATE.

The TRACE Cognitive Model provides an iterative system to guide a plurality of contributors in a coordinated, collaborative problem-solving process. This method is capable of guiding a plurality of users with divergent views toward a convergent problem resolution, where convergence is defined as the resolution of a plurality of views whereby joint contributors to task performance do not perform the same roles, nor contribute the same expertise. This method does not require consensus on all aspects of the task for contributors to perform their particular roles in the collaborative system, and so bypasses roadblocks of conventional, consensus-driven collaborative process models. Discrete responders on the network can maintain independent views, unconstrained by pressure for consensus from the group. As in evolution, genetic diversity, promotes more robust solutions.

Each round of responses serves as the basis for automated generation of future queries based upon previous query responses, comprising the steps of:

retrieving query responses from an individual agent or from group(s) of agents;

segmenting each response into key phrases;

scanning each phrase for patterns already in the pattern library, and for new patterns that need to be archived;

producing a query generator for each query response grouping found, or selecting a query generator from among those that respond to similar response profiles.

The subject invention, by tapping the collaborative intelligence of large groups, augments social networks using mobile devices to support collaborative problem-solving by a large, diverse group of distributed humans and agents. The present invention supports a problem-solving ecosystem that can overcome the constraints of top-down, hierarchical management in conventional, consensus-driven problem-solving models and one-to-one communication systems (telephone, mobile phone, email) by using mobile devices as one-to-many requester systems and networking tools.

It can be easily understood by anyone skilled in the art that the subject invention can serve diverse broadcast/comment, request/response applications, including, but not limited to, large events, such as conventions, learning and training, environmental remediation and disaster response, and health care delivery.

While certain exemplary embodiments have been described and shown in the accompanying drawings, it is to be understood that such embodiments are merely illustrative and not restrictive of the broad invention, and that this invention is not limited to the specific constructions and arrangements shown and described, since various other modifications may occur to those ordinarily skilled in the art described in this disclosure. In this area of technology, where growth is fast and further advancements are not easily foreseen, the disclosed embodiments are designed to be readily modifiable in arrangement and detail to facilitate incorporating technological advancements without departing from the principles of the present disclosure and the scope of the accompanying claims.

What is claimed:

1. A computer system for serving distributed client computers and mobile devices in a social network, wherein the computer system links distributed users, participating through multiple communication channels, with different levels of authorship and permissions, said computer system comprising:
one or more network interface;
one or more processor for performing instructions for:
combining collective intelligence methods for processing data from anonymous users with collaborative intelligence methods wherein user contributions are credited and tagged to individual users to make searchable contributor fingerprints which comprise the total record of contributor actions in the system;
enlisting entries from, and querying, distributed users and agents;
receiving and parsing natural language user entries to tag, categorize, group, classify attributes, and integrate diverse entries;
generating new queries based upon task requester and user needs, as well as user performance capability, as defined by prior performance and assessments, tagged to user profiles;
maintaining individual responses private, anonymous, and independent of each other when responders should not be influenced by each others' responses;
making responses visible and credited, as specified by the task requester, by each participant, and/or by task design;
providing regular updates on the globally integrated response status, visible to the social network designated by the specific process, thus enabling user input as specified by task design;
publishing selected responses for comment, rating or vote from distributed user-responders when an iterative approach can achieve convergence;
one or more data storage device for storing said instructions.

2. The computer system of claim 1, wherein the system further comprises
data processing units, serving and connecting one or more communication channels;
data analyzers able to receive, rate, cluster according to filtering criteria, search, tag and perform operations on data generated by users and gathered by the system;
search algorithms, based on "user fingerprints," task requester needs, and system requirements; and
clustering algorithms to group like users into subgroups, on which various automated procedures can be performed, wherein said procedures comprise, statistical analysis, predictive calculations, market and risk analysis, rating, tallying, grouping, tagging, sorting, linking user profiles, aggregating, integrating, targeting, publishing, or retaining as confidential.

3. The computer system of claim 1, wherein the instructions further comprise:
gathering information from, and about, users such that this information can be easily customized as demanded by the domain application and its task requirements;
broadcasting queries or task requests and gathering entries or responses such that diverse knowledge, assessments, and expertise of service providers in a social network can be engaged to make the event or task performance successful;
adjusting and customizing system behavior to support different levels of user expertise and different types of user participation;
enabling users to participate anonymously, or to be credited, or implementing a setting that determines which input is anonymous, and which credited.

4. The system of claim 1, wherein the instructions further comprise:
authenticating each user;
defining each user's unique user fingerprints as a combination of user profile, preferences, and said user's activity as tracked by the system;
enabling users to invite others to join the network, contribute or respond to entries, submit and respond to task requests, other queries, and other information;
enabling users to search the network, including, but not limited to, using keywords, profile and entry tags, and accessing responses to queries, not only by user name, but also by tagged content, geographical location, and time of response;
enabling users to respond to queries, task requests, or other input via an alpha-numeric or graphical user interface, whereby users can submit quantitative, text-based, verbal, or multiple choice responses to queries or other entries, including task requests and responses;
receiving user entries from mobile devices, computers or related apparatus, such that user data and other task related data is automatically classified into a processing network and retrievable through one or more channels as defined by the system.

5. The computer system of claim 1 wherein, after a registered user, who has set up a profile and preferences in the system, logs in, a dashboard is presented with a menu list of setup items corresponding to the buttons on the user interface, such that the user has options, which comprise:
picking conference talks and events to attend that will trigger the "starting now" alert button;
highlighting a map of the tradeshow floor with booths to attend;
selecting preferences, which determine how priority alerts are received; and
editing and augmenting preferences, and evolving each user's fingerprints through use of the system.

6. The computer system of claim 1, wherein constraints can be customized, said constraints comprising one or more geo-locational, physical attribute, time or task constraint.

7. The system of claim 1 wherein new content can be added on-the-fly by users in one or multiple channels, addressed to users in the same or other channels, such as from organizers to organizers, or from organizers to attendees, and including, but not limited to, content from organizers, sponsors, and users, said system allowing different categories of authorship, readership, permissions, content filtering, and access.

8. The system of claim 1 wherein entitlement permissions are adjustable as needed, and where categories of permissions, and means of granting permissions, can be revised, ranging from confidential to public, from anonymous to credited to the contributor, from published and readable, to open for comment, or with permission to edit.

9. The system of claim 1, employing a nine icon tic-tac-toe touch-screen for mobile devices, computer or other user interface, guiding the user through a step-by-step Query-Response or Task Requester-Responder sequence, which is followed in a natural clockwise sequence around the screen, or as needed by the user, where the ninth central button is used as the submit button, as a "starting now" or alerts button, or for other core functions.

10. The system of claim 1, wherein the system evolves as a result of both individual and aggregate behavior of users, and the overall status of the problem-solving process, wherein behaviors of the system respond to individual user participation, and to data on user behavior, response to incentives, capacity to engage other users, level of expertise and contribution to the system.

11. A computer-implemented method using natural language to elicit, receive, and organize information across diverse platforms comprised of servers, client computers and client mobile devices, using wireless, Wide Area Networks, and Local Area Networks, wherein non-structured natural language entries, queries and responses are converted to structured components that can be tagged, analyzed, searched, clustered, sorted and integrated Intelligent Integrating System to satisfy task requirements, user preferences, problem-solving constraints and trade-offs, and to deliver information as needed in response to user requests, profiles, preferences and past usage activity in the system, wherein coding of data enables data representation and data integration, further comprising:

classifying entries or query responses received, said classifying based on the type of entry or query intake;

time-stamps when contributions are submitted, and/or timestamp category clusters;

capacity to turn the time-stamp function on or off as determined by task needs;

geographic locators, wherein contributions are geographically located when submitted and/or clustered under geographic locator categories;

capacity to turn the geographic locator function on or off as determined by task needs;

context-coded and topic-coded natural language classifications and other tags;

relationship mapping, such that clusters augment user private-to-the-system profiles, which can be accessed from multiple nodes, and retrieved in various ways; and updating private-to-the-system user profiles based upon preferences, system usage, entries and query responses received from each user.

12. The computer-implemented method of claim 11, wherein an embedded continual assessment tool produces data assessing user and task performance, recording how users participated, and their preferences.

13. The computer-implemented method of claim 11, wherein geographic locators, tagging user inputs and responses, allow geographic analysis of user needs and resources, and capabilities to meet those needs by the Intelligent Integrating System, specifying queries by neighborhood, city, region, or other geographically defined category, clustering responses by location and other relevance factors, producing profile analyses of users, and comparative clustering across geographic categories with similar challenges and attributes, enabling geographically specified sub-routines to be specified by task requesters to the query system running in a defined region.

14. A system for network-based collaborative problem-solving capable of guiding a plurality of users with divergent views toward a convergent problem resolution using an Intelligent Integrating System, wherein the location and identity of the Intelligent Integrating System (IIS) can be distributed, reside in the cloud, or change without any perceivable experience of system change by the users, said system comprising non-transitory computer readable storage media, including program logic embedded therein that causes control circuitry to perform the following steps:

accessing user input;

comparing multiple user inputs;

identifying gaps and querying for missing information if responses do not provide complete information;

generating a plan responsive to critical path task execution requirements and perceived knowledge gaps;

generating queries based upon user profiles, preferences, and prior user activity in the system;

storing data in a repository accessible on the network, responsive to a context that requires identifying, collecting, and utilizing a pool of background data to generate analyses and subsequent queries;

generating and publishing, either to all users, or to a cluster of selected users, status reports or new queries on-the-fly based on comparative analysis of user inputs, profile analysis, geographic location, or identifying missing data points, thereby recognizing that the users or the system need further information;

converting natural language, text-based responses, choice clicks, and data into formats for categorization at different levels of detail:

accessing and tagging entries from humans, computer agents and devices:

comparing and, where appropriate, summing the input;

rating and tagging query responses of each agent, based upon the distance of that agent's input from the summation value;

defining each agent's profile based upon the consensual or outlier status of each entry contributed by that agent;

summing profiles to examine the population of agents, subgroups, and users as a whole: and examining consensus, outlier patterns, and mapping convergent changes toward a shared plan over time.

15. The system of claim 14, further comprising the steps of:

retrieving textual information from a query response;

scanning each query response for patterns of interest;

comparing one or more key components to data stored in a pattern library based upon past usage of the system;

comparing query responses with decision criteria data stored in a database;

classifying and linking patterns of interest into relational clusters; and merging similar query responses, such that merged queries are stored and retrieved based on common search terms;

wherein concept-based retrieval is incorporated within Boolean search engines.

16. The system of claim 14, using an interactive, or rule-based, processor to annotate or tag text, wherein any electronic document, text-based or having a mix of graphics, audio, video, and/or pre-defined hypertext in addition to text, containing statements, indices, variables, decision points, recommendations, or other data, can be adapted for tagging.

17. The system of claim 14, wherein queries can be structured by the software to provide directed guidance to achieve a convergent result, bypassing roadblocks of conventional, consensus-driven collaborative process models by enabling discrete responders on the network to enter independent views, unconstrained by pressure for consensus from the group, such that iterative query structuring is automated or allows human judgment in implementing an iterative query system to converge toward a problem solution.

\* \* \* \* \*